United States Patent [19]
Fletcher et al.

[11] 3,809,800
[45] May 7, 1974

[54] MEANS FOR ACCOMMODATING LARGE OVERSTRAIN IN LEAD WIRES

[76] Inventors: James C. Fletcher, Administrator of the National Aeronautics and Space Administration with respect to an invention of; Carl V. Rumble, Hampton; Kendall L. Driscoll, Newport News, both of Va.

[22] Filed: Apr. 25, 1973

[21] Appl. No.: 354,407

[52] U.S. Cl............ 174/70 R, 174/69, 174/DIG. 8, 244/151 R
[51] Int. Cl.... H02g 11/06, H01b 7/00, B64d 17/30
[58] Field of Search.......... 174/68 R, 69, 70 R, 135, 174/DIG. 8; 244/1 TD, 3, 148, 151 R, 151 A, 151 B, 155 R

[56] References Cited
UNITED STATES PATENTS

| | | | |
|---|---|---|---|
| 1,517,602 | 12/1924 | Trogner | 174/135 UX |
| 2,143,649 | 1/1939 | Dansard | 174/69 |
| 2,389,132 | 11/1945 | Borgelt | 174/69 X |
| 2,474,124 | 6/1949 | Schultz | 244/151 R |
| 3,068,316 | 12/1962 | Witt | 174/135 |
| 3,302,973 | 2/1967 | Ravau | 244/151 R X |
| 3,488,431 | 1/1970 | Nixon | 174/70 R |

*Primary Examiner*—Laramie E. Askin
*Attorney, Agent, or Firm*—Howard J. Osborn

[57] ABSTRACT

An electrical wire along whose length loops are formed at intervals and retained in a plastic capsule that allows unfolding of the loop when tension is exerted on the opposite ends of the wire. The capsule is formed by encompassing each loop with a sleeve of heat shrinkable synthetic plastic material which overlaps the loop and heat shrinking the overlapping portions.

Thus, a length of electrical wire is formed which stores extra lengths of wire in the quantity needed to match the expected stretching of materials or elements such as ropes, cords and the like of high elongation to which the electrical wire may be attached.

10 Claims, 2 Drawing Figures

MEANS FOR ACCOMMODATING LARGE OVERSTRAIN IN LEAD WIRES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a length of electrically conductible wire that stores extra lengths of the wire in the quantity needed to match the expected elongation of a cord or like material to which it is secured.

2. Description of the Prior Art

There are many occasions requiring the presence of electrically conductive wires in combination with load-substaining members such as ropes, cords and the like which either by design or by nature possess a high degree of elongation and stretch when a load is imposed thereon. Electrical conductors, however, are relatively inelastic or non-extensible. Consequently, in cases where these wires are secured to the stretchable load sustaining elements, there is a strong tendency for the conductive wire to snap on elongation of the load sustaining structure.

Illustrative of combinations of relatively inelastic conductible wire secured to elements of high elongation presenting the aforementioned problems are parachute lines or shrouds to which are attached lead wires from instrumentation the parachute carries. For instance, in high altitude tests where total load is measured, hard wire transmission lines are tied to main parachute straps a short distance from the load measuring cell to the on-board data acquisition system. Heretofore, the technique utilized involves storing a space length of cable near the payload package. Although very few cable tie points are required for such short runs, they still cause frequent wire breakage. Any force on the parachute straps causes the wire tie strings to become taut and thereby choke off the order pay-through of extra wire, which ultimately results in wire breakage. With the much longer (e.g., 30 feet or more) and more flexible parachute suspension lines, on the other hand, these single point extra storage schemes are not even considered since they have long proved inoperable.

SUMMARY OF THE INVENTION

Thus, one object of the invention is to provide a low-strain or relatively inelastic electrical conductive wire arrangement which can be used with long lengths of high-elongation materials without the wire breakage shortcomings of the prior art.

Another object of the invention is to provide an electrically conductive wire which stores extra lengths of wire in the quantity needed to match the expected stretching of materials or elements such as ropes, cords and the like of high elongation to which they may be secured.

Yet another object of the invention is to provide an electrically conductive wire arrangement secured to a stretchable material or element which arrangement has an extra wire pay out in synchronism with the change in length of the stretchable material.

A further object of the invention is to provide an electrically conductive wire arrangement which may be packaged with the stretchable material to which it is attached in a streamlined manner so as to be deployable with constraint to the stretchable load-sustaining elements to which it is intimately tied.

These and other objects of the invention are obtained by an article of manufacture which comprises a length of electrically conductive wire at least a portion of which is in the form of a loop, a sleeve of heat-shrinkable synthetic material encompassing and overlapping said loop, the overlapping portions of said sleeve being heat shrunk to form a retaining capsule for said loop that allows unfolding of the loop when tension is exerted on opposite ends of the wire.

Advantageously, the wire comprises a plurality of the loop-retaining capsules located at intervals, along the length of the wire. Preferably the storage points or capsules of wire loops are relatively closely spaced at regular intervals along the wire so as to respond to the local incremental elongation of stretchable material to which it is attached.

By the term "loop" as used in this application is meant any folding of the length of wire between its ends that shortens or draws up the distance the wire spans from end to end. Although the present invention contemplates the use of multiple loops within the capsule as exemplified, for instance, by coils or a series of accordian-like folds, it is preferred to use a simple fold-back or double foldback loop. Regardless of the particular form the loop or loops take, however, it is important to arrange same so as to preclude tangling and create minimum frictional or inertia forces during operation.

DESCRIPTION OF THE DRAWING

In the accompanying drawing several preferred embodiments are shown by way of illustration and not by way of limitation. In the drawing.

DETAILED DESCRIPTION OF THE INVENTION

Figure 1:
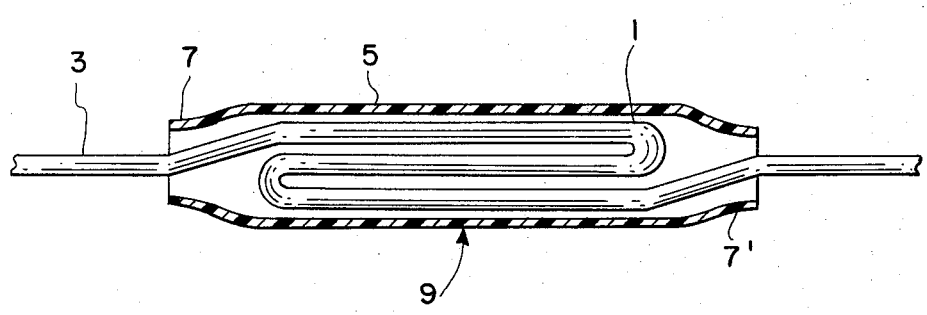
FIG. 1 is an enlarged fragmentary view of the wire assembly of the present invention.

Referring to the drawing, one or more foldback loops 1, in the quantity needed, are made at desired intervals in an electrically conductive wire 3, such as a strain-gage signal transmission wire. A length of heat shrinkable plastic tubing 5 slightly longer than the foldback loop is slipped over each wire bundle, preferably with equal overhang at each end. The ends of the overhang portions 7 and 7' are then heat shrunk to close them down so as to form a retaining capsule (indicated generally as 9) for the bundle of wire inside, yet not so tight as to impede the pay-out of wire when used.

The electrically conductive wire 3 having at least one of the loop-retaining capsules 9, can be secured to any desired stretchable load-sustaining element such as a rope, cord, parachute suspension lines and the like of high elongation. Ordinarily the stretchable elements are of elastic material. Advantageously, the extra length of wire stored in the capsules 9 in loop form is stored in a quantity that matches the expected stretching of the stretchable element to which it is secured, preferably in synchronism with the change in length of the stretchable element.

Any of the heat shrinkable plastic materials of art may be used as the shrinkable tubing component of the invention. Among the suitable shrinkable plastic material may be included synthetic polymeric materials such as pliofilm, polyvinylidene chloride, polyethylene, polypropylene, which have been mono- or preferably biaxially oriented or otherwise treated to rended them heat-shrinkable.

The heat-shrink temperature employed will vary depending upon the particular plastic tubing employed but will in all instances be high enough to effect the desired shrinking and below the temperature at which the plastic material employed degrades. Also any suitable heating means or elements such as a narrow plane, hot electrical wire, soldering iron or the like designed to project heat directly to the overhanging portions of the plastic sleeves only may be employed.

Figure 2:
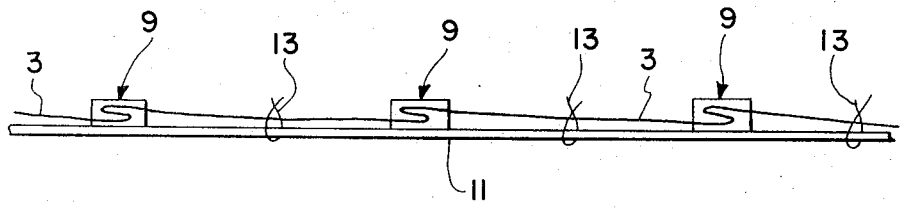
FIG. 2 is a diagrammatic view of the wire assembly of the invention tied to a load-sustaining cord.

An example of one specific arrangement of the invention which works well on a deployed parachute is shown diagrammatically in FIG. 2. In this arrangement a length of wire 3 comprising a plurality of loop-containing capsules 9 of heat-shrinkable polyethylene spaced at 5 inch intervals from each other is attached to a parachute suspension line 11 by suitable fastening means 13 such as a tie-down or sew-down at points between the loop-retaining capsules. The foldback length of wire in each capsule 9 is just over one-half inch to assure that a base material stretch of 20 percent can be accommodated. The breakaway load of the wire in sliding out from the retaining capsule is less than 1 pound. The wire used is AWG No. 32 equivalent, stranded, nonshielded, with four such wires being twisted together to form a single four-conductor strain-gage cable. The shrinkable sleeving from which the retaining capsule is made is about 0.8 inch long and has an outside diameter of about one-eighth inch. The loop-retaining capsules were formed by heating the overhanging portions with a soldering iron.

While the invention has been described in detail with respect to certain now preferred examples and embodiments of the invention it will be understood by those skilled in the art after understanding the invention, that various changes and modifications may be made without departing from the spirit and scope of the invention, and it is intended therefore, to cover all such changes and modifications in the appended claims.

What is claimed as new and desired to be secured by letters patent of the United States is:

1. An article of manufacture comprising a length of electrically conductive wire at least a portion of which is in the form of at least one loop, a sleeve of heat-shrinkable synthetic plastic material encompassing and overlapping said loop, the overlapped portions only of said sleeve being heat shrunk to form a retaining capsule for said loop that allows unfolding of said loop when a controlled amount of tension is exerted on opposite ends of said wire.

2. The article of manufacture of claim 1 wherein said wire comprises a plurality of said loop-retaining capsules spaced at intervals along its length.

3. The article of manufacture of claim 2 wherein the intervals are regular intervals.

4. The article of manufacture of claim 3 wherein said intervals are about 5 inches and the length of the wire stored in said capsule is about 0.5 inch.

5. In combination, a stretchable base element having secured thereto the article of manufacture of claim 4 wherein the article of manufacture is oriented relative to the base element in a direction parallel to an anticipated direction of stretch and secured by attachment means at points on the base element intermediate to the retaining capsules.

6. In combination, a stretchable base element having secured thereto the article of manufacture of claim 3 wherein the article of manufacture is oriented relative to the base element in a direction parallel to an anticipated direction of stretch and secured by attachment means at points on the base element intermediate to the retaining capsules.

7. In combination, a stretchable base element having secured thereto the article of manufacture of claim 2 wherein the article of manufacture is oriented relative to the base element in a direction parallel to an anticipated direction of stretch and secured by attachment means at points on the base element intermediate to the retaining capsules.

8. In combination, a stretchable base element having secured thereto the article of manufacture of claim 1 wherein the article of manufacture is oriented relative to the base element in a direction parallel to an anticipated direction of stretch and secured by attachment means at points on the base element remote from the retaining capsules.

9. The combination of claim 8 wherein the stretchable base element is of an elastic material.

10. The combination of claim 8 wherein loops are provided in a quantity that substantially matches the expected elongation of the stretchable element.

* * * * *